United States Patent [19]

Flamme

[11] Patent Number: 5,324,545
[45] Date of Patent: Jun. 28, 1994

[54] DIP-COATING METHOD FOR PROTECTING CHROMATIZED OR PASSIVATED ZINC COATINGS ON STEEL OR THE LIKE

[75] Inventor: Burkhard Flamme, Hagen, Fed. Rep. of Germany

[73] Assignee: Ewald Dorken AG, Herdecke, Fed. Rep. of Germany

[21] Appl. No.: 981,166

[22] Filed: Nov. 19, 1992

[30] Foreign Application Priority Data

Nov. 21, 1991 [DE] Fed. Rep. of Germany ....... 4138218

[51] Int. Cl.⁵ .............................................. B05D 1/18
[52] U.S. Cl. ................................... 427/406; 427/409; 427/435; 148/247
[58] Field of Search ................. 427/406, 409, 435; 148/247, 243

[56] References Cited

U.S. PATENT DOCUMENTS

| | | | |
|---|---|---|---|
| 4,339,310 | 7/1982 | Oda et al. | 148/247 |
| 4,341,558 | 7/1982 | Yashiro et al. | 148/247 |
| 4,396,650 | 8/1983 | Lange et al. | 427/409 |
| 4,546,018 | 10/1985 | Ryuzo et al. | 427/410 |
| 4,600,447 | 7/1986 | Opitz et al. | 148/247 |
| 4,808,483 | 2/1989 | Nakasuji et al. | 427/409 |

FOREIGN PATENT DOCUMENTS

0184705 6/1986 European Pat. Off. .

*Primary Examiner*—Michael Lusignan
*Assistant Examiner*—Erma Cameron
*Attorney, Agent, or Firm*—Herbert Dubno

[57] ABSTRACT

Chromated or passivated (phosphated) zinc and zinc alloy coatings on workpieces are provided with a protective coating which is largely inorganic and formed from titanium or zirconium chelate and/or titanium or zirconium acid ester and an organofunctional polysiloxane applied in solution form by a post-treatment dipping.

13 Claims, No Drawings

DIP-COATING METHOD FOR PROTECTING CHROMATIZED OR PASSIVATED ZINC COATINGS ON STEEL OR THE LIKE

FIELD OF THE INVENTION

My present invention relates to a method of protecting chromated or phosphated zinc or zinc-coated metal or other (e.g. plastic) workpieces from corrosion and environmental effects and, more particularly, to the after-treatment of metal workpieces subsequent to the chromatizing or passivating treatment of a zinc coating or a zinc-alloy coating thereon.

Background of the Invention

In the metallurgical field it is not uncommon to provide steel sheets or strip, steel workpieces generally, and finished products of steel, like fasteners and similar elements, with metal or metalizing coatings to protect steel against corrosion. Typical of the coatings which can be applied are galvanically-deposited zinc, mechanically or dip-deposited zinc, correspondingly formed coatings of zinc alloys, or chromatized or phosphatized or passivated zinc coatings on steel or on another metal.

It is not uncommon to provide such coatings with a lacquer as an additional protection against environmental effects and in an after-treatment, usually involving a dipping of the part in the lacquer.

However, the use of a lacquer is not always desirable or advantageous as will be developed below.

Typical of the parts handled in this manner are screws, nuts, fastening elements of other types like hinges, connectors, hook-type fasteners and the like, and all kinds of hardware, fixtures and fittings, including door, cabinet, kitchen, commercial, industrial and agricultural hardware and fittings.

In a typical after-treatment following the application of the zinc coating with a passivation treatment and/or a chromate treatment (chromatizing), the part may be dipped into an organic treatment medium. A typical medium for this purpose can be an aqueous organic synthetic resin dispersion containing corrosion inhibitors or film-forming agents to provide a corrosion barrier.

This protects the zinc coating against corrosion. Prior techniques of this type, however, have not been fully satisfactory, usually because the duration of effectiveness of the after-treatment was not sufficient.

It is also known to treat the zinc coating with a chromic acid containing agent forming an inorganic post-dipping medium. This has the disadvantage that chromic acid systems are environmental pollutants.

OBJECTS OF THE INVENTION

It is, therefore, the principal object of the present invention to provide an improved post-dipping medium for the immersion coating of zinc-coated and chromatized and/or passivated objects which will avoid the drawbacks of prior art systems and will form a long-lasting protective coating for the treated surfaces.

Another object of the invention is to provide an improved method of post treatment of the chromatized, passivated or nonpassivated galvanic or melt-coated article in which zinc has previously been applied to the object.

Yet another object of this invention is to provide after-treatment for zinc-plated and chromatized and or passivated steel workpieces which is simple to carry out and provides an extremely durable and possibly even permanent coating against corrosion of the zinc layer, but which is relatively friendly to the environment, i.e. does not require disposal of noxious, poisonous or toxic material.

DESCRIPTION OF THE INVENTION

These objects and others which will become apparent hereinafter are attained, in accordance with the invention which utilizes for the after-treatment of a zinc workpiece, a zinc-plated metal workpiece, especially a steel workpiece, or a zinc-coated nonmetallic workpiece, a binder combination in a solvent of a titanium acid ester and an organofunctional polysiloxane whereby the solvent is an organic solvent, especially an alcohol or a hydrocarbon.

Alternatively, the binder combination is a combination of a titanium acid ester, a titanium chelate and organofunctional polysiloxane, the solvent being an alcohol or a hydrocarbon or a mixture thereof, alone or mixed with water.

In a third alternative the binder combination is a combination of a titanium chelate and an organofunctional polysiloxane with the solvent being water or an alcohol or a hydrocarbon or a mixture thereof.

In any of the binder compositions of the invention, a mixture of the organofunctional polysiloxanes may be used and, similarly, combinations of titanium chelates may be employed when a titanium chelate is present, or a combination of titanium acid esters may be employed when the titanium acid ester is present.

The after-treatment agent is put up in the form of a solution into which the article is immersed. The solution can be transparent or colored and the treated article can be electrolytically galvanized and phosphatized and/or passivated as desired, whereby the passivation is free from hexavalent chromium. The dipping process for the after-treatment may leave a coating of a thickness of 4 to 6 microns on the object and the dip-coating may be effected by simple immersion or in a dip-centrifugation process.

A forced-air drying of the dip-coated product can be effected at about 80° C. and/or a baking of the coating at a temperature up to about 200° C. can be effected.

The post-treatment agent is substantially inorganic and has the advantage that extremely thin coatings of the product can provide corrosion resistance which is at least 5 to 10 times greater than the corrosion resistance without the after-treatment.

The system of the invention makes use of a new substantially inorganic protective coating and coating-application method after a zinc coating is applied galvanically or by immersion of a steel workpiece in molten zinc and phosphatized and/or passivated. It uses a primarily inorganic binder composition and the protective coating for the zinc can be relatively thin. The dip coating can be effected in an additional bath of a conventional zinc-plating apparatus or at the end of a chromatizing line without the need to remove the treated part from the transport and conveying system.

The drying can be effected in standard drying furnace or oven at conventional drying temperatures.

A special advantage of the present invention is that the coating can be readily removed when desired, especially from objects which are coated concurrently with the zinc-plated articles and which are not to be additionally coated. This removal of the coating can be effected without difficulty in a conventional degreasing or pickling bath.

The residues of the present invention are organic salts which can be decomposed by conventional waste-water treatment and do not require special destruction efforts.

Through the use of the present invention and the after-treatment agent described, instead of conventional chromatizing, the chromatizing can be effected with chromium (III) in place of the chromium (VI) hitherto required.

The chromium (VI) is toxic to a high degree whereas the chromium (III) chromatization can be effected so that the post-treatment coating is greatly improved.

It appears that the inorganic components of the post-treatment agent of the invention react with the chromium (III) chromatizing to ensure a high degree of adhesion without bubble formation.

This may be a result of the fact that molecular water contained in the chromatization attaches to free OH groups, COOH groups and nitrogen.

Instead of a chromating of the zinc or zinc alloy coating on the steel workpiece, a phosphatization of the galvanizing coating is also possible prior to the application of the protective coating according to the invention, whereby, after the use of the post treatment dipping bath, bonding is effected to the molecular water of the phosphate layer in the form of hydrate bridges.

More specifically, the method of the present invention can comprise the steps of:
(a) dipping a workpiece having a chromated and/or passivated zinc or zinc-alloy coating in a solution of a binder composition in a solvent system wherein the binder composition and solvent system are selected from the group which consists of:
(1) a binder composition of at least one titanium or zirconium acid ester and at least one organofunctional polysiloxane in an organic solvent system,
(2) a binder composition of at least one titanium or zirconium acid ester, at least one titanium or zirconium chelate and at least one organofunctional polysiloxane in a solvent system selected from the group which consists of at least one alcohol, at least one hydrocarbon, a mixture of at least one alcohol and at least one hydrocarbon and mixtures thereof with water, and
(3) a binder composition of at least one titanium or zirconium chelate and at least one organofunctional polysiloxane in a solvent system selected from the group which consists of water, at least one alcohol, at least one hydrocarbon, and mixtures thereof, thereby coating the workpiece with an at least partially inorganic protective coating; and
(b) drying the protective coating on the workpiece.

The composition can thus be defined as being selected from the group which consists of:
(1) a binder composition of at least one titanium or zirconium acid ester and at least one organofunctional polysiloxane in an organic solvent system,
(2) a binder composition of at least one titanium or zirconium acid ester, at least one titanium or zirconium chelate and at least one organofunctional polysiloxane in a solvent system selected from the group which consists of at least one alcohol, at least one hydrocarbon, a mixture of at least one alcohol and at least one hydrocarbon and mixtures thereof with water, and
(3) a binder composition of at least one titanium or zirconium chelate and at least one organofunctional polysiloxane in a solvent system selected from the group which consists of water, at least one alcohol, at least one hydrocarbon, and mixtures thereof.

The acid ester and the chelate are most preferably titanium acid esters or a titanium chelate although mixtures of a zirconium acid ester or zirconium chelate can be used and the corresponding zirconium acid esters and chelates to those provided for titanium can be employed.

Advantageously the hydrocarbon is a $C_{1-10}$ straight, branched or cyclic saturated or unsaturated hydrocarbon.

The alcohol can be a $C_{1-10}$ straight or branched saturated or unsaturated alcohol.

The acid ester is preferably a titanic acid ester of a $C_{1-10}$ straight or branched saturated or unsaturated alcohol.

The polysiloxane is advantageously a polymeric siloxane having 2 to 10 repeating siloxane units and at least two terminal organofunctional groups per molecule.

The chelate can be a chelate of a lower alkyleneaminetetraacetic acid.

Examples of the titanium esters which can be used include n-butyltitanate monomer (tetrabutylorthotitanate), n-butyltitanate polymer (n-butylpolytitanate) and isobutyltitanate (tetraisobutyltitanate).

Examples of the titanium chelate which may be used include titaniumacetylacetonate, (diisopropoxy)-bis(2,4-pentandionato)-titanium (IV) i.e. $(C_3H_7O)_2Ti(C_5H_7O_2)_2$ in i-$C_3H_7OH$, isopropoxy-ethoxy-bis (2,4-pentandionato-titanium), and titanium chelate ETAM (methyldiglycoltriethanolaminetitanate).

An example of a polysiloxane which can be used is that marketed as Dynasilane Glymo, i.e. the 3-glycidyloxypropyltrimethoxysilane

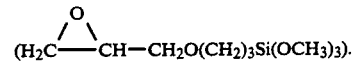

A typical binder composition of the type referred to as binder composition (1) can include a titanium acid ester selected from the group which consists of:
n-butyltitanate monomer
n-butyltitanate polymer
isobutyltitanate
n-propyltitanate
isopropyltitanate, and
2-ethylhexyltitanate
with a $TiO_2$ content of 13.5 to 35% by weight and an alcohol content between 65 and 86.5% by weight of the composition, the preferred alcohol being isopropanol.

For binder composition (2), the titanium acid ester can be from the group listed above while the preferred titanium-chelate is titaniumacetylacetonate or titanium chelate ETAM with the alcohol content between 25 and 5% by weight and the $TiO_2$ content between 13 and 23% by weight.

In the binder composition (3), the titanium chelate is as above, the alcohol content is 10% by weight and in all three variants the polysiloxane is a Dynasilane Glymo concentrate.

The following are preferred compositions:

Composition 1

20% by weight polysiloxane
10% by weight titanium acid ester
70% by weight alcohol or gasoline hydrocarbons Reaction is carried out with stirring with a reaction time between 1 second and 1 hour.

Composition 2

5% by weight titanium acid ester
5% by weight titanium chelate
20% by weight polysiloxane
70% by weight alcohol or gasoline hydrocarbons Reaction time as above.

Composition 3

20% by weight polysiloxane
10% by weight titanium chelate
10-20% by weight alcohol
50-60% by weight demineralized water Reaction condition as above.

The treatment of the invention can be applied to zinc coatings on steel parts applied by:
1. Alkali electrolytic galvanization
2. Electrolytic cyanidic galvanization, or
3. Electrolytic acid galvanization.

The zinc plating can be effected with or without brighteners.

Zinc alloy coatings on steel parts which can be used can include zinc alloyed with cobalt, nickel, iron or titanium.

Mechanical zinc coatings which can be treated in accordance with the invention are claddings of zinc dust applied with glass balls and combinations of zinc dust with aluminum powder, nickel powder and iron powder.

Sherardizing Cementation

Zinc coatings formed with zinc dust or combinations of zinc dust and iron powder applied with heat by drum coating can also be treated. Typical parts which may be treated are those coated with zinc as above and composed of steel which may be copper coated or brass coated. Zinc or aluminum die castings may also be treated directly or after coating with zinc in the manner described.

The steel parts which can be treated are cold-rolled steel parts, heat-treated steel parts, tempered steel parts, low-carbon steels and high-strength steels.

The zinc coatings may have a thickness between 4 and 50 microns.

As noted, the zinc surfaces which are treated with the compositions of the invention are chromatized or passivated zinc surfaces. Chromatization can be effected by rinsing electrolytically or mechanically coated parts with zinc or zinc alloy coatings by ordinary water, activating the surfaces if necessary with mineral or organic acids at a concentration between 0.1 to 20%, and dipping the thus treated parts in a chromatizing solution. The temperature of the chromatizing solution can be between 10° and 80° C., the pH between 1 and 6 for a contact time between 1 second and 1 minute.

For application of the binder composition (3) containing water, the chromatized part is dried in an oven or by a centrifuge and then dipped or rinsed with deionized water and then dipped into the binder composition (3). When binder compositions (1) and (2) are used, the chromatized parts are previously dried.

An example of a suitable chromatizing solution, for 100 liters total, can consist of:
20.0 kg chromic acid
3.5 kg sulfuric acid
5.0 kg sodium nitrite, and
water to 100 liters.

The parts may be activated with 0.3% by weight nitric acid (20%) before chromatization.

A typical process involves dipping of the chromatized parts for 5 to 30 seconds at room temperature into the composition and then centrifugally removing excess. When the composition (3) is used, drying can be completed in the centrifuge.

When composition (1) and (2) are used, drying is effected in an oven with circulating air.

The coating is burned in by a heat treatment which can involve 25 minutes at 80° C., 15 minutes at 100° C., 10 minutes at 150° C. and 5 minutes at 200° C., all in terms of the temperature of the object treated.

The resulting coating does not change the optical characteristics of the zinc coating and chromatization and no hydrogen is found to penetrate into the base metal from the dipping composition. The latter is free from heavy metals. Chromatized surfaces show a uniform appearance. The applied film is nonsticky and is free from carcinogenic and environmentally toxic materials. The UV resistance of chromatized layers are improved a number of times, especially with black chromatization. The friction and scratch resistance of the chromatized layers are also improved.

Corrosion prevention effect as measured by the salt spray test under German Industrial Standard DIN 50021-SS:

| Example | Result |
|---|---|
| 4–6μ zinc + blue passivation | at least 8 h without zinc corrosion) without invention coating |
| 2–6μ zinc + blue passivation | at least 48 h without iron corrosion) without invention coating |
| 4–6μ zinc + blue passivation | at least 120 h without zinc corrosion) with 4–8μ of the invention coating |
| 4–6μ zinc + blue passivation | at least 240 h without iron corrosion) with 4–8μ of the invention coating |
| Passivation Chrome VI-free | |
| 15–20μ zinc + blue passivation | at least 48 h without zinc corrosion) without invention coating |
| 15–20μ zinc + blue passivation | at least 144 h without iron corrosion) without invention coating |
| 15–20μ zinc + blue passivation | at least 120 h without zinc corrosion) with invention coating |
| 15–20μ zinc + blue passivation | at least 240 h without iron corrosion) with invention coating |
| 4–6μ zinc + blue chromatization | at least 72 h without zinc corrosion) without invention coating |
| 4–6μ zinc + blue chromatization | at least 120 h without iron corrosion) without invention coating |
| 4–6μ zinc + blue chromatization | at least 120 h without zinc corrosion) with invention coating |
| 4–6μ zinc + blue chromatization | at least 240 h without iron corrosion) with invention coating |

Of the compositions described, the first variant (1) has been found to be relatively moisture sensitive with respect to the finished protective coating. The second variant (2) is practically free from any moisture sensitivity while the third variant (3) has still less of a sensitivity to moisture and has the best and most stable bonding with the underlying coating.

Most advantageously, the polysiloxane has terminal epoxide groups or the polysiloxane component can include polysiloxanes with terminal epoxy groups.

Among the systems of the invention, the best reactions are obtained with titanium chelates and esters which lead to especially effective corrosion protection and the preferred solvent is isopropanol. It has also been found to be advantageous to include in the post-treatment solution a lubricant in the form of a polyvalent polyalcohol having free hydroxyl groups.

It is known in the art to provide the threads of screws or nuts, after the application of zinc coatings and chromatization, with lubricants. These lubricants, however, readily wash off and pose environmental hazards. Furthermore, the lubrication effect is thereby lost.

By incorporating the lubricant as a component in the post-treatment solution of the present invention, the lubricant is chemically bonded in the protective coating so that it is retained there against leaching and cannot pose an environmental hazard. The friction characteristics of the coated workpiece are thereby significantly improved.

Preferably, the mixing ratio and weight percent of the titanium acid ester:polysiloxane is about 1:2 or 1:3 or 1:4. Of these ratios, 1:2 is preferred.

In the case of composition (2), the mixing ratio of weight percent of the titanium acid ester:titanium chelate is preferably 1:1 and the ratio of this mixture:polysiloxane is 1:1, 1:2 or 1:3. The most preferred ratio being 1:1.

The organic polysiloxane in the binder composition of the invention serves especially as a bonding agent. It is an advantage of the present invention that the chromatized coating following the application of the protective coating of the present invention remains resistant to high temperatures in the range of 200° C., for example, and shows a reduced tendency to develop a white encrustation (white rust).

I claim:

1. A method of post-treating a chromated or passivated zinc or zinc-alloy coating on a steel workpiece, comprising the steps of:
   (a) dipping a steel workpiece having a chromated or passivated zinc or zinc-alloy coating in a solution of a binder composition in a solvent system wherein said bonder composition and solvent system are selected from the group which consists of:
      (1) a binder composition consisting essentially of at least one titanium or zirconium acid ester and at least one organofunctional polysiloxane in an organic solvent system,
      (2) a binder composition consisting essentially of at least one titanium or zirconium acid ester, at least one titanium or zirconium chelate and at least one organofunctional polysiloxane in a solvent system selected from the group which consists of at least one alcohol, at least one hydrocarbon, a mixture of at least one alcohol and at least one hydrocarbon and mixtures thereof with water, and
      (3) a binder composition consisting essentially of at least one titanium or zirconium chelate and at least one organofunctional polysiloxane in a solvent system selected from the group which consists of water, at least one alcohol, at least one hydrocarbon, and mixtures thereof,
   thereby coating said workpiece with an at least partially inorganic protective coating capable of protecting the chromated or passivated zinc or zinc-alloy coating directly against corrosion; and
   (b) drying said protective coating on said workpiece and exposing said protective coating directly to any corrosive environment from which said chromated or passivated zinc or zinc alloy coating is to be protected.

2. The method defined in claim 1 wherein said acid ester and said chelate are titanium acid ester and titanium chelate.

3. The method defined in claim 2 wherein said hydrocarbon is a $C_{1-10}$ straight, branched or cyclic saturated or unsaturated hydrocarbon.

4. A method of post-treating a chromated or passivated zinc or zinc-alloy coating on a steel workpiece, comprising the steps of:
   (a) dipping a steel workpiece having a chromated or passivated zinc or zinc-alloy coating in a solution of a binder composition in a solvent system wherein said binder composition and solvent system are selected from the group which consists of:
      (1) a binder composition consisting essentially of at least one titanium or zirconium acid ester and at least one organofunctional polysiloxane in an organic solvent system,
      (2) a binder composition consisting essentially of at least one titanium or zirconium acid ester, at least one titanium or zirconium chelate and at least one organofunctional polysiloxane in a solvent system selected from the group which consists of at least one alcohol, at least one hydrocarbon, a mixture of at least one alcohol and at least one hydrocarbon and mixtures thereof with water, and
      (3) a binder composition consisting essentially of at least one titanium or zirconium chelate and at least one organofunctional polysiloxane in a solvent system selected from the group which consists of water, at least one alcohol, at lest one hydrocarbon, and mixtures thereof,
   thereby coating said workpiece with an at least partially inorganic protective coating capable of protecting the chromated or passivated zinc or zinc-alloy coating directly against corrosion; and
   (b) drying said protective coating on said workpiece, said acid ester and said chelate being titanium acid ester and titanium chelate, said hydrocarbon being a $C_{1-10}$ straight, branched or cyclic saturated or unsaturated hydrocarbon, said alcohol being a $C_{1-10}$ straight or branched saturated or unsaturated alcohol and exposing said protective coating directly to any corrosive environment from which said chromated or passivated zinc or zinc alloy coating is to be protected.

5. The method defined in claim 4 wherein said acid ester is a titanic acid ester of a $C_{1-10}$ straight or branched saturated or unsaturated alcohol.

6. The method defined in claim 5 wherein said polysiloxane is a polymeric siloxane having 2 to 10 repeating siloxane units and at least two terminal organofunctional groups per molecule.

7. The method defined in claim 6 wherein said titanium chelate is a chelate of a lower alkyleneaminetetraacetic acid.

8. The method defined in claim 6 wherein said polysiloxane has epoxide terminal groups.

9. The method defined in claim 6 wherein said solvent system includes isopropanol.

10. The method defined in claim 6 wherein said solution includes a lubricant in the form of a polyvalent polyalcohol having free hydroxyl groups.

11. The method defined in claim 6 wherein said binder composition contains a ratio of titanium acid ester to the polysiloxane between substantially 1:1 and 1:5 in weight percent.

12. The method defined in claim 11 wherein said ratio is 1:2 or 1:3 or 1:4.

13. The method defined in claim 6 for the composition (2) wherein the titanium acid ester and the titanium chelate are in a ratio of substantially 1:1 in weight percent and the combination of the titanium acid ester and the titanium chelate are in a ratio to the polysiloxane or substantially 1:1, 1:2 or 1:3 in weight percent.

* * * * *